United States Patent [19]
Sutton

[11] Patent Number: 5,661,699
[45] Date of Patent: Aug. 26, 1997

[54] ACOUSTIC COMMUNICATION SYSTEM

[75] Inventor: Paul W. Sutton, Chula Vista, Calif.

[73] Assignee: The United States of America as represented by the Secretary of the Navy, Washington, D.C.

[21] Appl. No.: 605,250

[22] Filed: Feb. 13, 1996

[51] Int. Cl.$^6$ .................................................. H04B 11/00
[52] U.S. Cl. ........................................... 367/132; 367/199
[58] Field of Search ................................. 340/939, 944, 340/825.44, 825.46; 381/81, 85, 57, 107, 108, 94; 367/132, 157, 198, 199

[56] References Cited

U.S. PATENT DOCUMENTS

| | | |
|---|---|---|
| 4,039,999 | 8/1977 | Weston . |
| 4,203,160 | 5/1980 | Doherty . |
| 4,276,624 | 6/1981 | Fisher et al. . |
| 4,432,079 | 2/1984 | Mackelburg et al. . |
| 4,438,526 | 3/1984 | Thomalla . |
| 4,679,177 | 7/1987 | Aoyagi et al. . |
| 5,024,288 | 6/1991 | Shepherd et al. . |
| 5,089,997 | 2/1992 | Pecukonis . |
| 5,136,547 | 8/1992 | Laukien . |
| 5,136,555 | 8/1992 | Gardos . |
| 5,555,533 | 9/1996 | Peck .................................. 367/132 |

Primary Examiner—Ian J. Lobo
Attorney, Agent, or Firm—Harvey Fendelman; Peter A. Lipovsky; Michael A. Kagan

[57] ABSTRACT

An acoustic communication system comprises: a voice processing circuit which generates a first signal representing a voice message; a noise sensor channel which generates a second signal in response to detecting background noise in an environment; a microcomputer which receives the first and second signals, and provides a third signal to a selected one of first and second output ports of the microcomputer, where the amplitude of the third signal is functionally related to the value of the second signal; an ultrasonic output channel coupled to the first output port and which generates an ultrasonic output signal representing the voice message in response to receiving the third signal; a pubic address channel coupled to the second output port which generates an audible signal representing the voice message in response to receiving the third signal; and an ultrasonic receiving system which generates an audible output representing the voice message in response to receiving the ultrasonic output signal.

18 Claims, 5 Drawing Sheets

ACOUSTIC COMMUNICATION SYSTEM

BACKGROUND OF THE INVENTION

The present invention generally relates to the field of acoustic communications, and more particularly to a system which selectively transmits acoustic energy in the audible and/or ultrasonic frequency ranges based on predetermined criteria.

Virtually all commercial and military ships have public address systems that are deliberately designed to be very loud so that the messages they convey are intelligible. However, in some applications, such as in high noise environments or in radio silence operating modes, it is desirable to operate the audio communication systems so that messages are essentially undetectable by unauthorized persons, but where in other applications using the same systems, it is desirable for the messages to be detected by many persons. Therefore, a need exists for an audio communication system that can be operated in a public address mode so that audio messages may be broadcast to many persons, and/or in an ultrasonic confidential mode so that messages may only be detected by specially designated individuals.

SUMMARY OF THE INVENTION

The present invention provides an acoustic communication system which selectively outputs an acoustic signal over a conventional loudspeaker, and/or by a silent ultrasonic channel in response to prescribed rules. The system comprises a voice processing circuit which generates a first signal representing a voice message; a noise sensor channel which generates a second signal in response to detecting background noise in an environment; a microcomputer which receives the first and second signals, and provides a third signal to a selected one of first and second output ports of the microcomputer, where the amplitude of the third signal is functionally related to the value of the second signal; an ultrasonic output channel coupled to the first output port and which generates an ultrasonic output signal representing the voice message in response to receiving the third signal; a pubic address channel coupled to the second output port which generates an audible signal representing the voice message in response to receiving the third signal; and an ultrasonic receiving system which generates an audible output representing the voice message in response to receiving the ultrasonic output signal.

An important advantage of the present invention is that it may transmit voice signals through an ultrasonic transmitter and receiver channel in order to facilitate speech communications in a high noise environment, to limit access to such communications to authorized personnel only, and/or to broadcast such messages though a public address system.

Another advantage of the system is that voice communications are processed digitally, thereby providing more intelligible sound distribution at lower power levels than provided by analog systems.

A still further advantage of the invention is that it provides voice communications without generating radio frequency emissions that could be detected by unintended recipients and used to locate the source of the radio frequency emissions.

BRIEF DESCRIPTION OF THE DRAWINGS

Throughout the several views, like elements are designated with like reference numbers.

DESCRIPTION OF THE PREFERRED EMBODIMENT

Figure 1:
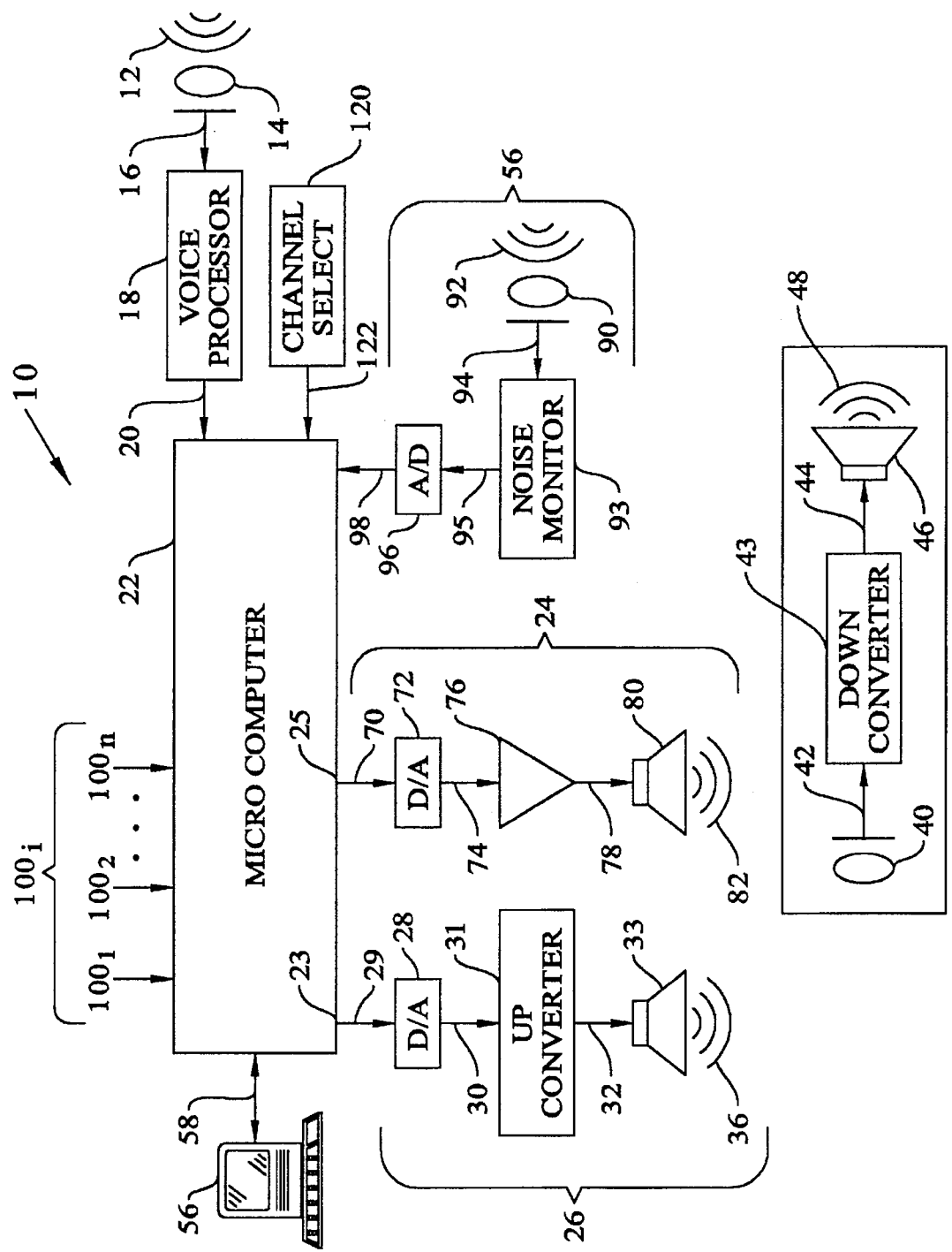
FIG. 1 is a block diagram of an acoustic communication system embodyiny various features of the present invention.

Referring to FIG. 1, there is shown, an acoustic communication system 10 which may be configured to automatically selectively enable conventional public address and/or silent (to humans) ultrasonic frequency operational modes. A voice message 12 input to microphone 14 is transformed into an analog electrical signal 16 that is converted into a digital signal 20 by voice processor 18. A microcomputer 22 routes the digital signal 20 to either a public address channel 24 or an ultrasonic output channel 26.

The ultrasonic output channel 26 includes a digital-to-analog (D/A) converter 28 which transforms a digital, amplitude modulated signal 29, representing voice signal 14, into an analog electrical signal 30 having a waveform and frequency representing voice signal 12. The output channel 26 is enabled by microcomputer 22 when a routine 198 (described further herein with reference to FIG. 4) implemented in the microcomputer determines that the message in the audio signal 12 is to be communicated in a manner which avoids detection by unauthorized persons. An up-converter 31 preferably transforms the analog electrical signal 30 into an analog electrical signal 32 having an ultrasonic frequency, as for example, in the range of 40–50 kHz. An ultrasonic transmitter, or speaker 33 broadcasts an ultrasonic audio signal 36 in response to receiving the analog electrical signal 32. The frequency of the ultrasonic signal 36 is particularly advantageous because it is well beyond the normal audio detection range of the human ear.

In response to detecting the ultrasonic audio signal 36, an ultrasonic receiver 40 generates an analog electrical signal 42 that is transformed by a down-converter 43 into an analog electrical signal 44 having a frequency in the audio range. A conventional speaker 46 transforms the analog electrical signal 44 into an audio signal 48 that is detectable within the normal hearing range of the human ear. By way of example, the speaker 46 may be mounted in a headset, not shown, so that audio signal 48 may be heard only by one specific person.

When the microcomputer 22 determines that the message contained in audio signal 14 should have unrestricted distribution, the routine 198 implemented in microcomputer 22 causes the message to be conveyed via the public address channel 24 rather than through the ultrasonic audio channel 26. In such case, a digital, amplitude modulated output electrical signal 70 is provided by the microcomputer 22 to digital to analog converter 72 which transforms signal 70 into an analog electrical signal 74. Voltage amplifier 76 transforms signal 74 into an amplified electrical analog signal 78. In response to receiving electrical analog signal 78, loud speaker 80 generates an audio signal 82 which may be heard by anyone within the audible range of the signal 82.

Still referring to FIG. 1, the acoustic communication system 10 also includes a noise sensor feedback circuit 56 that provides a signal input used to attenuate the amplitude of analog signal 78 to a predetermined level with respect to the background noise in the vicinity of the microphone 14. The noise sensor feedback circuit 56 includes a microphone 90 which transforms ambient background noise 92 in the area where message 12 is generated into an analog electrical signal 94 which is provided to a noise monitor circuit 93. The noise monitor circuit 93 provides an output signal 95 that represents the ambient noise level present in the vicinity of the microphone 90. The signal 95 is used to control the amplitudes of ultrasonic signal 36 and/or audio signal 82. Analog-to-digital converter 96 transforms analog electrical signal 95 from the noise monitor circuit into a digital signal 98 that is received by microcomputer 22. The signal 95 is provided as an input into a suitable algorithm implemented in microcomputer 22. The algorithm may be used to attenuate the digital, amplitude modulated signal 70 generated by microcomputer 22 which is provided to public address channel 24. Such algorithms are well known by those skilled in this field of technology.

A PC based computer 56 may be employed as a master control station to monitor and set the operating parameters of microcomputer 22 via data bus 58. For example, the computer 56 may be employed to provide input commands to microcomputer 22, whereby channels 26 and/or 24 are selected while the microcomputer awaits further input commands. Master control station 56 also may be used to present attenuation level commands to microcomputer 22 in response to varying ambient noise levels and the acoustic characteristics in the Vicinity of the microphones 14 and 90. The microcomputer 22 may then process the attenuation level commands into output signals to control, for example, the gain of amplifier 76. Master control station 56 may also perform on-line diagnostics of the status and conditions of the various components comprising the acoustic communication system 10.

Figure 2:
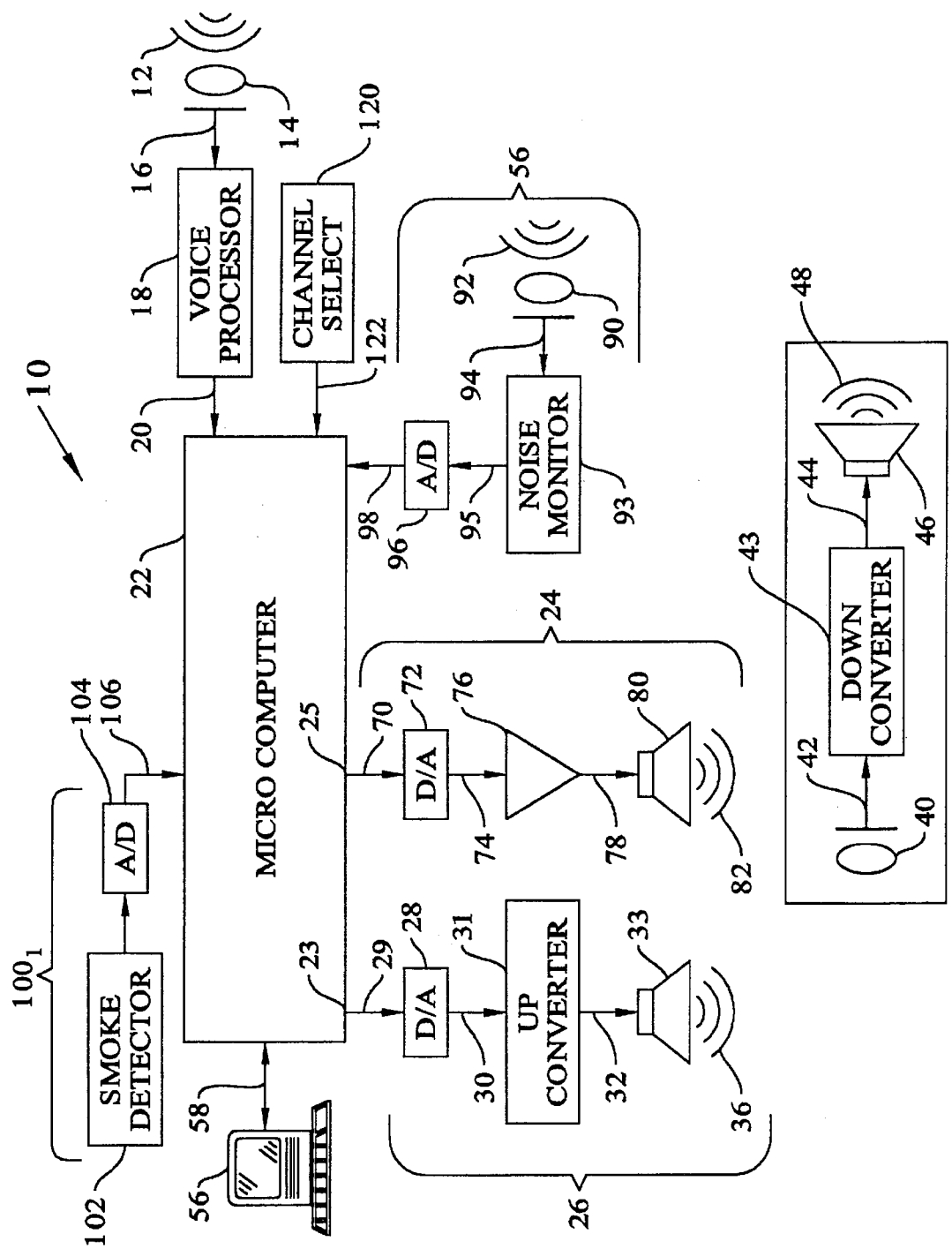
FIG. 2 is a block diagram of an acoustic communication system of the type shown in FIG. 1 further including a smoke/heat detection channel.

Computer 56 may also provide commands to microcomputer 22 which direct microcomputer 22 to automatically enable and/or disable any or both of channels 26 and 24, depending on the status of one or more input channels $100_i$, where I represents the number of input channels, I is a positive integer and $I \geq 1$. More specifically, the routine 198 directs the operation of the microcomputer 22 to provide an output signal, i.e., signals 29 and/or 70 to an m number of n output ports, where m and n are integers, $0 \leq m \leq n$, and $n \geq 2$. For example, as shown in FIG. 2, n=2, corresponding to the output ports 23 and 25 of microcomputer 22 which provide signals 29 and 70, respectively. For the particular implementation of the acoustic communication system 10 shown in FIG. 2, m may represent none of the output ports 23 and 25, output port 23, output ports 23 and 25, or output port 25, depending on the requirements of a particular application.

By way of example, channel $100_1$ may be implemented as a smoke/heat detection circuit, as shown in FIG. 2, which includes a smoke/heat detector 102 and an analog-to-digital converter 104 which provides a signal 106 to microcomputer 22. For example, when the value of signal 106 exceeds a predetermined threshold value, microcomputer 22 may automatically select public address channel 24 so that a warning message indicating detection of smoke and/or heat may be delivered to a wide audience. Any combination of the outputs of channels $100_2$, $100_3$, ... $100_i$ may be employed to provide signals used as inputs to routine 198 to control which of the channels 24 and 26 are enabled or disabled. Software routines which enable microcomputer 22 to make such determinations and selections are well known by those skilled in the art.

Figure 3:
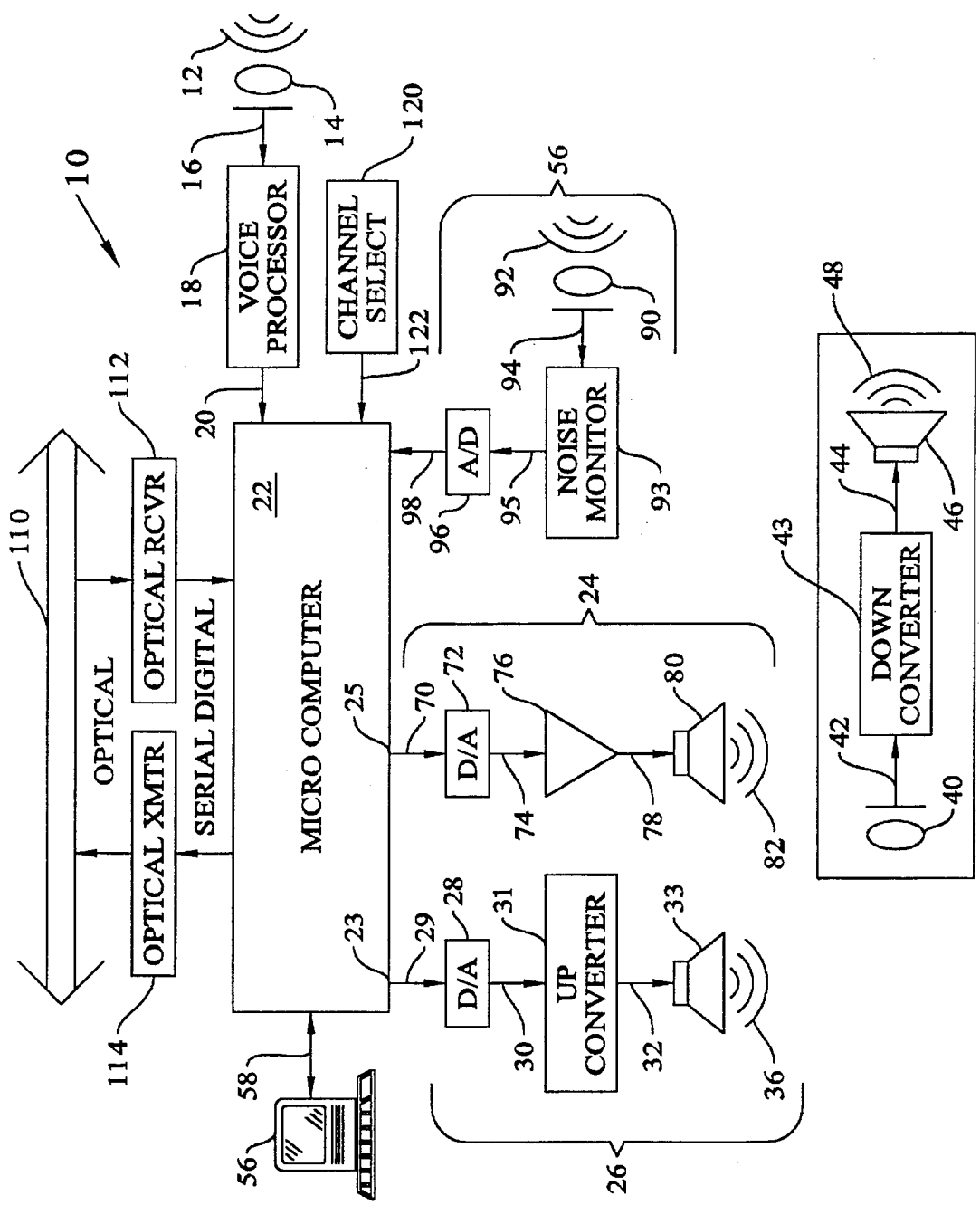
FIG. 3 is a block diagram of an acoustic communication system of the type shown in FIG. 1 shown connected to a fiber optic data bus.

Referring to FIG. 3, the acoustic communication system 10 may also be configured to provide two-way communications between the microcomputer 22 and a fiber optic bus 110. Messages may be received from the fiber optic bus through an optical receiver 112. Messages may be provided to the fiber optic bus by way of an optical transmitter 114.

The routing of the outputs of microcomputer 22 may be manually controlled by channel select 120 which provides, for example, a control signal 122 to microcomputer 22. The control signal 122 may be used to select the operating mode of the audio communication system 10.

Figure 4:
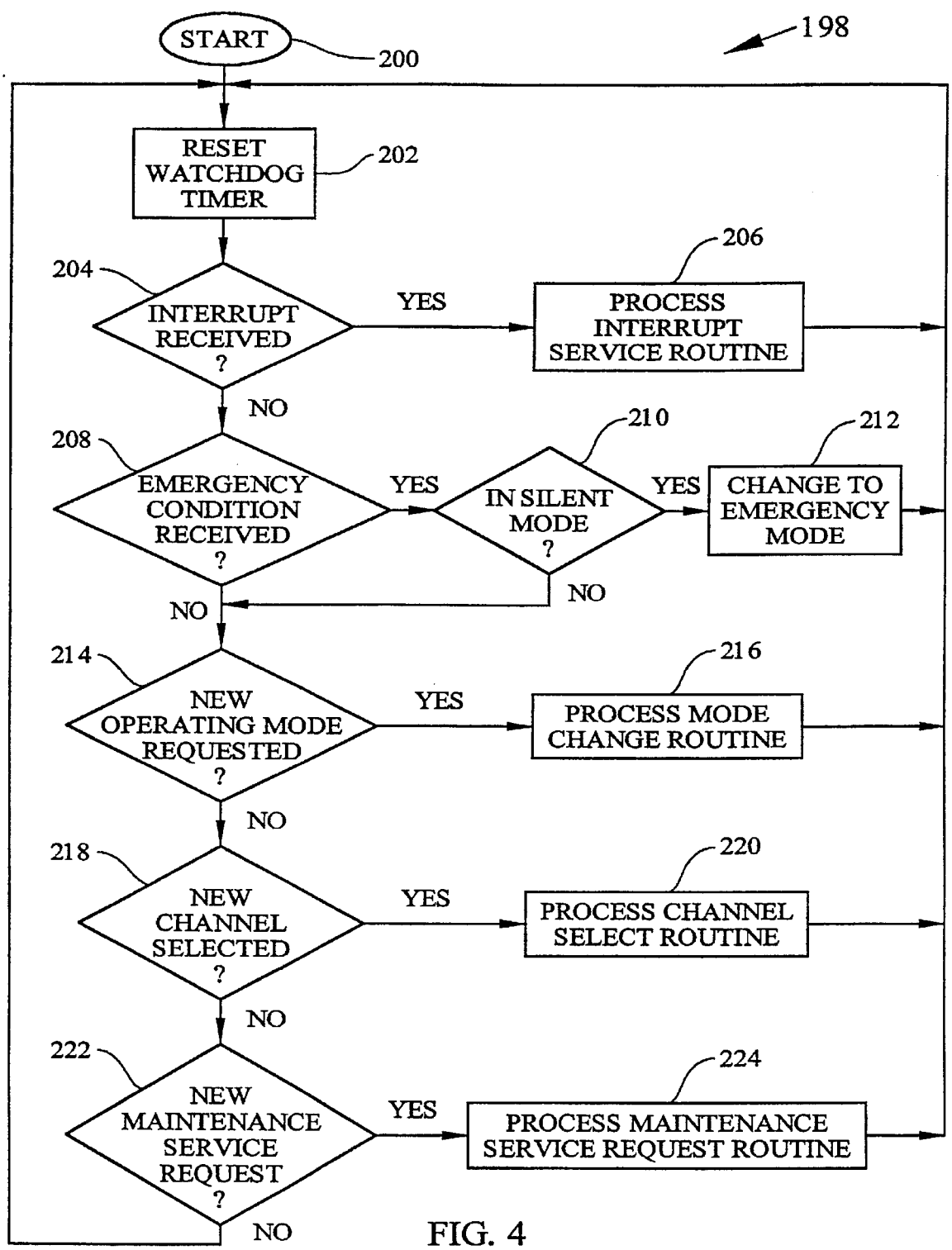
FIG. 4 shows a flowchart of a supervisory routine which may be implemented in the microcomputer shown in FIGS. 1–3.

FIG. 4 shows a flowchart illustrating an example of supervisory routine 198 which may be implemented in software for controlling the operation of microcomputer 22. However, it is to be understood that the scope of the invention includes the implementation of other supervisory routines as well. Starting at step 200, the supervisory routine 198 proceeds to step 202 which resets a watchdog timer (not shown) implemented in the microcomputer 22. The watchdog timer resets the routine 198 if no input is received by the routine 198 within a suitable reset period in order to overcome any "freeze-up" of the routine that may occur. At step 204, the routine 198 determines whether an interrupt signal has been received by the microcomputer 22. If the determination at step 204 is YES, the routine continues to step 206 which processes the interrupt signal. An interrupt signal for example, may be an instruction provided by the channel select 120. After the interrupt signal is processed at step 206, the routine 198 returns to step 202. If the determination at step 204 is NO, then at step 208 the routine 198 determines if an emergency interrupt signal, such as when signal 106 (FIG. 2) has a certain value, has been input into routine 198.

Still referring to FIG. 4, if the determination at step 208 is NO, i.e., no emergency condition is indicated and the routine 198 proceeds to step 214. However, if the determination at step 208 is YES, the routine 198 determines if the system 10 is being operated in a silent mode. The silent mode refers to the condition in which the ultrasonic audio channel 26 is enabled and the public address channel 24 is disabled. If the determination at step 210 is YES, the microcomputer 22 is directed by step 212 to enable the public address channel 24. Ultrasonic audio channel 26 may remain enabled, or may be disabled to suit the requirements of a particular application. After completion of step 212, routine 198 returns to step 202.

At step 214, routine 198 determines if a new operating mode is requested, as for example, via computer 56 or channel select 120. An operating mode refers to the particular output ports, as for example, output ports 23 and 25, which are enabled. As shown in FIG. 2, a q number of output ports are shown, where byway of example, q refers to two output ports 23 and 25. However, the invention may be generalized such that q is an integer and $0 \leq q \leq n$. As previously defined, n represents the number of output ports of computer 22, which by way of the example shown in FIG. 2 is equal to two.

If the determination at step 214 is YES, the operating mode of microcomputer 22 is changed to implement the change request. Such operating modes may include providing a signal to channels 24 and/or 26 so that the communication system 10 is operated in the ultrasonic (silent mode) and/or public address mode. An example of a change request may include an instruction provided by any of input lines $100_i$ or channel select 120 that directs microcomputer 22 to enable public address system 24 and disable ultrasonic audio channel 26, or vice-versa.

At step 218, routine 198 determines if the public address channel 24 and/or ultrasonic audio channel 26 have been selected to be enabled. If the determination at 218 is YES, then at step 220, routine 198 implements an appropriate instruction to enable the selected channel(s). The routine then returns to step 202.

If the determination at step 218 is NO, routine 198 proceeds to step 222 which determines if a maintenance service request has been made by mater control station 56. By way of example, a maintenance service request may be an on-line diagnostic query from master control station 56 to microcomputer 22 to check the output level of voltage amplifier 76. If the determination at step 222 is YES, the routine 198 processes the request and continues to step 202. If the determination at step 222 is NO, routine 198 returns to step 202.

By way of example, commercially available components suitable for use in the present invention are provided in TABLE 1. However, it is to be understood that the invention may be practiced using components other than those specifically listed.

Figure 5:
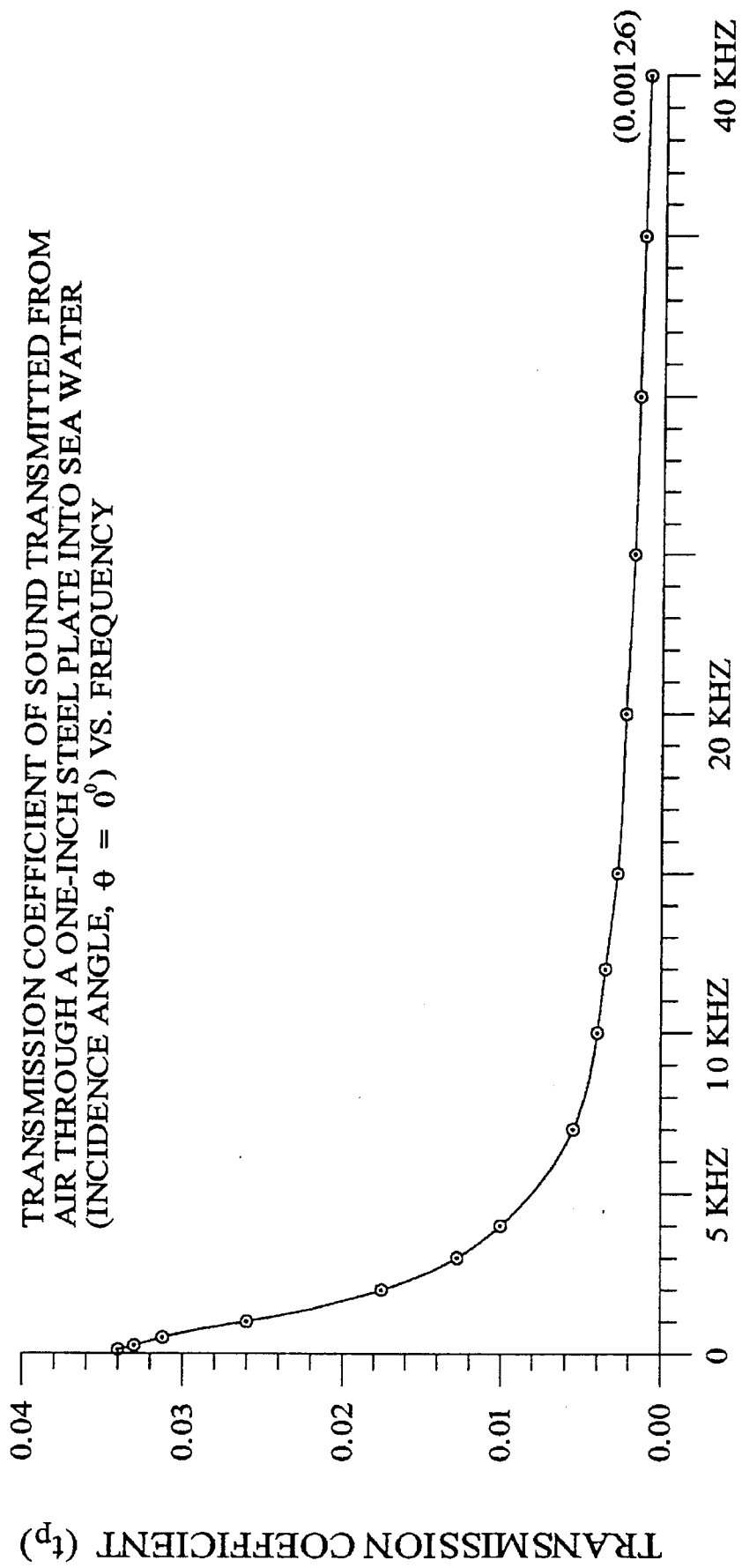
FIG. 5 is a graph showing the transmission coefficient of sound from air through a steel plate to sea water as a function of frequency.

The invention is particularly suited for use in submarines because under certain operating conditions, it is desirable to minimize audio energy emissions from the submarine, whereas in other operating conditions, audio energy emissions may be tolerable or even desired. FIG. 5 shows the transmission coefficient, $t_p$, of sound transmitted from air through a one inch steel plate into sea water as a function of frequency. FIG. 5 is derived from the equation presented below [See Rzhevkin, S. N., *A Course On The Theory of Sound*, Macmillan Co., New York, 1963]:

$$t_p = \sqrt{\frac{1}{\eta}} = \left( \frac{\left(\frac{R_3}{R_1}+1\right)^2 - \left(\frac{R_3^2}{R_2^2}-1\right)\left(\frac{R_2^2}{R_1^2}-1\right)\sin^2(k_2 d)}{4\frac{R_3}{R_1}} \right)^{-1/2}$$

where:

$R_1 = \rho_1 c_1$;

$R_2 = \rho_2 c_2$;

$R_3 = \rho_3 c_3$;

$\eta$ is the coefficient of sound insulation of steel for normal incidence;

$\rho_1$ is the density of air at standard temperature and pressure;

$c_1$ is the speed of sound in air at standard temperature and pressure;

$\rho_2$ is the density of steel;

$c_2$ is the speed of sound in steel;

$\rho_3$ is the density of saltwater;

$c_2$ is the speed of sound in saltwater;

$K_2 = 2\Pi f/c_2$;

f is the carrier frequency of the audio signal; and d is the thickness of the steel plate.

FIG. 5 shows that the transmission coefficient of sound transmission decreases generally in an asymptotic relation with respect to frequency. Thus, it may be appreciated that when audio messages are transmitted via ultrasonic audio channel 26, any audio energy emanating from the hull of a submarine is greatly attenuated, thereby rendering detection of such audio energy very difficult by unauthorized persons.

Obviously, many modifications and variations of the present invention are possible in light of the above teachings. Therefore, it is to be understood that within the scope of the appended claims, the invention may be practiced otherwise than as specifically described.

TABLE 1

| REFERENCE NO. | DESCRIPTION | MANUFACTURER | MODEL NO. |
| --- | --- | --- | --- |
| 14 | Dynamic, high-impedence microphone | Shure | 515SDLC |
| 18 | Digital voice processor | Hughes Aircraft Co. 29947 Avenida de las Banderas, Rancho Santa Magarita, CA 92688 | VIP110 |
| 22 | IBM-compatible microcomputer, graphics workstation, or VME board | Various | Various |
| 120 | Voice channel select switch | Industrial Electronic Engineers, Inc. 7740 Lemona Ave. VanNuys, CA 91409 | IEE34447-02 Control Display Unit, or custom switch pad |
| 28, 72, 96, 104 | Analog-to-digital and digital-to-analog converter | Signalogic 9704 Skillman, Ste. 111, Dallas, TX 75243 | SIG32C-8 DSP Board (includes (4) D/A & (4) A/D) converters |
| 31, 33, 40, 43, 46 | Ultrasonic transmitter, receiver, and converters | HNC, Inc. 5501 Oberlin Dr. San Diego, CA 92121-1718 | Ultracom, SBIR Contact No. N6600167-91-C-0060 |
| 76, 80 | Computer controlled 200-watt, 70VAC audio amplifier and 25-ohm, 70VAC loudspeaker | Innovative Electronic Designs, Inc., 9701 Taylorsville Rd., Louisville, KY 40299 | IED6270L |

TABLE 1-continued

| REFERENCE NO. | DESCRIPTION | MANUFACTURER | MODEL NO. |
|---|---|---|---|
| 56 | Master Control Station, IBM-compatible keyboard and display | Various | Various |
| 102 | Smoke detector and heat sensor | Home Automation Systems, Inc. 151 Kalmus Dr., Ste L4, Costa Mesa, CA 92626 | HAS-7497 |
| 110, 112, 114 | Optical transmitter, receiver, and fiber optic bus | Fibronics International, 16 Esquire Rd. North Billerica, MA 01862 | FX8616 FDDI/Ethernet LAN |
| 90, 93 | Ambient noise sensor and monitor | Innovative Electronic Designs, Inc. | 540S |

I claim:

1. An acoustic communication system, comprising:

a voice processing circuit which transforms a voice message into a first signal;

a noise sensor channel which generates a second signal in response to detecting background noise in an environment;

a microcomputer which receives said first and second signals, and provides a third signal to an m number of n output ports, where m and n are integers, $0 \leq m \leq n$, and $n \geq 2$, said third signal having amplitude characteristics functionally related to said second signal;

an ultrasonic output channel coupled to a first one of said output ports and which generates an ultrasonic output signal representing said voice message in response to receiving said third signal; and a pubic address channel coupled to a second one of said output ports which generates an audible signal representing said voice message in response to receiving said third signal.

2. The acoustic communication system of claim 1 further including an ultrasonic receiving system which generates an audible output representing said voice message in response to receiving said ultrasonic output signal.

3. The acoustic communication system of claim 1 wherein said first signal is a digital signal.

4. The acoustic communication system of claim 1 wherein said noise sensor channel includes a noise monitor circuit.

5. The acoustic communication system of claim 1 wherein said ultrasonic output channel includes an up-converter circuit.

6. The acoustic communication system of claim 1 wherein said pubic address channel includes a voltage amplifier and a first audio speaker coupled to said voltage amplifier.

7. The acoustic communication system of claim 2 wherein said ultrasonic receiving system includes:

an ultrasonic energy detector which generates a first analog electrical signal in response to detecting said ultrasonic output signal;

a down-converter which transforms said first analog electrical signal into a second analog electrical signal; and a second audio speaker which transforms said second analog electrical signal into an audible signal representing said voice message.

8. An acoustic communication system, comprising:

a voice processing circuit which transforms a voice message into a first signal;

a noise sensor channel which generates a second signal in response to detecting background noise in an environment;

a microcomputer which receives said first and second signals, and provides a third signal to an m number of n output ports, where m and n are integers, $0 \leq m \leq n$, and $n \geq 2$, said third signal having amplitude characteristics functionally related to said second signal;

a channel select control which provides a control signal to said microcomputer that directs said microcomputer to provide said third signal to a q number of output ports, where q is an integer and $0 \leq q \leq n$;

an ultrasonic output channel coupled to a first one of said output ports and which generates an ultrasonic output signal representing said voice message in response to receiving said third signal; and a pubic address channel coupled to a second one of output ports which generates an audible signal representing said voice message in response to receiving said third signal.

9. The acoustic communication system of claim 8 further including an ultrasonic receiving system which generates an audible output representing said voice message in response to receiving said ultrasonic output signal.

10. The acoustic communication system of claim 8 wherein said voice processing circuit transforms said voice message into a digital signal.

11. The acoustic communication system of claim 8 wherein said noise sensor channel includes a noise monitor circuit.

12. The acoustic communication system of claim 8 wherein said ulltrasonic output channel includes an up-converter circuit.

13. The acoustic communication system of claim 8 wherein said pubic address channel includes a voltage amplifier and a first audio speaker coupled to said voltage amplifier.

14. The acoustic communication system of claim 9 wherein said ultrasonic receiving system includes:

an ultrasonic energy detector which generates a first analog electrical signal in response to detecting said ultrasonic output signal;

a down-converter transforms said first analog electrical signal into a second analog electrical signal; and a second audio speaker which transforms said second analog electrical signal into an audible signal representing said voice message.

15. The acoustic communication system of claim 8 further includes a smoke detection circuit which generates a fourth signal, and wherein said ultrasonic output channel generates said ultrasonic output signal when said fourth signal exceeds a threshold value.

16. The acoustic communication system of claim 8 further including:

an optical transmitter which generates a first optical signal in response to receiving a fifth signal from said microcomputer;

a fiber optic bus which is coupled to receive said first optical signal from said optical transmitter; and an optical receiver which provides an sixth signal to said microcomputer in response to receiving a second optical signal from said fiber optic bus.

17. An acoustic communication system, comprising:

a voice processing circuit which transforms a voice message into a first signal;

a noise sensor channel which generates a second signal in response to detecting background noise in an environment;

a microcomputer which receives said first and second signals, and provides a third signal to an m number of n output ports, where m and n are integers, $0 \leq m \leq n$, and $n \geq 2$, said third signal having amplitude characteristics functionally related to said second signal;

an ultrasonic output channel coupled to a first one of said output ports and which generates an ultrasonic output signal representing said voice message in response to receiving said third signal;

a pubic address channel coupled to a second one of said output ports which generates an audible signal representing said voice message in response to receiving said third signal;

an optical transmitter which generates a first optical signal in response to receiving said third signal from said microcomputer;

a fiber optic bus which is coupled to receive said first optical signal from said optical transmitter; and an optical receiver which provides a third signal to said microcomputer in response to receiving a second optical signal from said fiber optic bus.

18. The acoustic communication system of claim 17 further including an ultrasonic receiving system which generates an audible output representing said voice message in response to receiving said ultrasonic output signal.

* * * * *

UNITED STATES PATENT AND TRADEMARK OFFICE
CERTIFICATE OF CORRECTION

PATENT NO. : 5,661,699
DATED : 26 August 1997
INVENTOR(S) : Paul W. Sutton

It is certified that error appears in the above-identified patent and that said Letters Patent is hereby corrected as shown below:

Title page, item [57],
In the ABSTRACT, at line 12: Change "pubic" to --public--.

Column 1, line 40: Change "pubic" to --public--.

Column 7, line 34: Change "pubic" to --public--.

Column 7, line 50: Change "pubic" to --public--.

Column 8, line 32: Change "pubic" to --public--.

Column 8, line 50: Change "pubic" to --public--.

Column 10, line 5: Change "pubic" to --public--.

Signed and Sealed this

Thirteenth Day of January, 1998

Attest:

BRUCE LEHMAN

*Attesting Officer*  *Commissioner of Patents and Trademarks*